(12) United States Patent
Donderici (10) Patent No.: US 9,664,028 B2
(45) Date of Patent: May 30, 2017

(54) SYSTEMS AND METHODS FOR LOOK AHEAD RESISTIVITY MEASUREMENT WITH OFFSET WELL INFORMATION

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/650,224

(22) PCT Filed: Dec. 19, 2012

(86) PCT No.: PCT/US2012/070592
§ 371 (c)(1),
(2) Date: Jun. 5, 2015

(87) PCT Pub. No.: WO2014/098840
PCT Pub. Date: Jun. 26, 2014

(65) Prior Publication Data
US 2015/0300150 A1 Oct. 22, 2015

(51) Int. Cl.
*G01V 3/00* (2006.01)
*E21B 44/00* (2006.01)
(Continued)

(52) U.S. Cl.
CPC ............. *E21B 44/005* (2013.01); *E21B 7/04* (2013.01); *E21B 47/121* (2013.01);
(Continued)

(58) Field of Classification Search
CPC .... E21B 44/005; E21B 47/121; E21B 49/003; E21B 7/04
(Continued)

(56) References Cited

U.S. PATENT DOCUMENTS

| 4,513,376 A | 4/1985 | Barber |
| 5,230,386 A * | 7/1993 | Wu .................. E21B 7/046 |
| | | 175/45 |

(Continued)

FOREIGN PATENT DOCUMENTS

| CN | 101482013 A | 7/2009 |
| CN | 101932955 A | 12/2010 |

(Continued)

OTHER PUBLICATIONS

International Search Report and Written Opinion issued in related PCT Application No. PCT/US2012/070592 mailed Sep. 20, 2013, 13 pages.

(Continued)

*Primary Examiner* — Nader Bolourchi
(74) *Attorney, Agent, or Firm* — Benjamin Fite; Baker Botts L.L.P.

(57) ABSTRACT

Systems and methods for obtaining deep resistivity measurements are described herein. The method may include obtaining first formation data from a first borehole within a formation. The method may further include obtaining second formation data from a drilling assembly disposed in a second borehole. In certain embodiments, the drilling assembly may comprise a drill bit and a measurement-while-drilling (MWD) or logging while drilling (LWD) assembly, and may be actively drilling the second borehole. The second formation data may correspond to a portion of the formation ahead of and around the drill bit. The first formation data and the second formation data may be correlated to identify a formation characteristic. The method may further include altering an operating condition of the drilling assembly based, at least in part, on the formation characteristic.

20 Claims, 8 Drawing Sheets

(51) Int. Cl.
  *E21B 7/04* (2006.01)
  *G01V 3/26* (2006.01)
  *G01V 3/38* (2006.01)
  *E21B 47/12* (2012.01)
  *E21B 49/00* (2006.01)

(52) U.S. Cl.
  CPC .............. *E21B 49/003* (2013.01); *G01V 3/26* (2013.01); *G01V 3/38* (2013.01)

(58) Field of Classification Search
  USPC ........................................................ 340/853.6
  See application file for complete search history.

(56) References Cited

U.S. PATENT DOCUMENTS

| | | | |
|---|---|---|---|
| RE35,386 E | | 12/1996 | Wu et al. |
| 6,272,434 B1* | | 8/2001 | Wisler .................... E21B 7/068 |
| | | | 702/11 |
| 7,538,555 B2 | | 5/2009 | Banning et al. |
| 2004/0154831 A1 | | 8/2004 | Seydoux et al. |
| 2006/0017443 A1 | | 1/2006 | Folberth et al. |
| 2006/0195264 A1* | | 8/2006 | Galil El Askary ..... E21B 7/046 |
| | | | 702/7 |
| 2009/0237083 A1 | | 9/2009 | Ostermeier et al. |
| 2010/0000791 A1* | 1/2010 | Alberty ................... E21B 21/08 |
| | | | 175/45 |
| 2010/0000792 A1* | 1/2010 | Alberty ................. E21B 47/026 |
| | | | 175/50 |
| 2011/0133740 A1 | 6/2011 | Seydoux et al. |
| 2011/0298461 A1 | 12/2011 | Bittar et al. |
| 2013/0311094 A1* | 11/2013 | Donderici .......... G01R 27/2611 |
| | | | 702/7 |

FOREIGN PATENT DOCUMENTS

| | | |
|---|---|---|
| RU | 2304292 C2 | 8/2007 |
| RU | 2326414 C1 | 6/2008 |
| WO | 2010/005902 A2 | 1/2010 |
| WO | 2012/102705 A1 | 8/2012 |
| WO | 2013/019233 A1 | 2/2013 |

OTHER PUBLICATIONS

International Preliminary Report on Patentability issued in related PCT Application No. PCT/US2012/070592, mailed on Jul. 2, 2015 (10 pages).

Office Action issued in related Chinese Application No. 201280077327.8, mailed Aug. 3, 2016 (23 pages).

Office Action issued in related Russian Application No. 2015118349, mailed Oct. 21, 2016 (16 pages).

* cited by examiner

SYSTEMS AND METHODS FOR LOOK AHEAD RESISTIVITY MEASUREMENT WITH OFFSET WELL INFORMATION

CROSS-REFERENCE TO RELATED APPLICATION

The present application is a U.S. National Stage Application of International Application No. PCT/US2012/070592 filed Dec. 19, 2012, which is incorporated herein by reference in its entirety for all purposes.

BACKGROUND

The present disclosure relates generally to well drilling operations and, more particularly, to systems and methods for look ahead resistivity with offset well information.

Modern well drilling operations require precise steering controls and operations to land boreholes in hydrocarbon formations, while avoiding dangerous or otherwise undesirable formation strata. Such steering operations may require that a borehole start on a generally vertical trajectory and transition to a horizontal trajectory as it nears a particular formation strata boundary, so as to land in the desired formation strata. Tools that generate electromagnetic waves can be used to investigate the surrounding formation for strata boundaries, but at long distances, due to the presence of multiple layers in typical formations and low tool sensitivity far from the borehole, the tools have limited effectiveness at identifying formation boundaries. Given the limited dog leg capability for most drilling operations, on the order of 10° per 100 feet, the lack of accurate deep formation measurements makes it difficult to identify the formation boundary early enough for the borehole to land effectively in the desired formation strata.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to systems and methods for look ahead resistivity with offset well information.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drilled around a mid-depth "stuck fish" and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

According to aspects of the present disclosure, systems and methods for obtaining deep resistivity measurements are described herein. The method may include obtaining first raw measurements from a first borehole within a formation. The first borehole may comprise, for example, an offset well used for surveying the formation. The method may further include obtaining second raw measurements from a drilling assembly disposed in a second borehole. In certain embodiments, the drilling assembly may comprise a drill bit and a measurement-while-drilling (MWD) or logging while drilling (LWD) assembly, and may be actively drilling the second borehole. The second raw measurements may be obtained from the MWD/LWD assembly, or another similar tool as will be described below. Notably, as will also be described below, the second raw measurement may correspond to a portion of the formation ahead of and around the drill bit. The first raw measurement and the second raw measurement may be processed, and the first processed raw measurement and the second processed raw measurement may be correlated to identify a formation characteristic. As will be described below, by correlating the second processed raw measurement and the first processed raw measurement, which may comprise survey data, for example, the accuracy of the deep measurements may be increased, providing more lead time to steer the drilling assembly. The method may further include altering an operating condition of the drilling assembly based, at least in part, on the formation characteristic. As will be described below, altering the operating condition may include causing the trajectory of the drilling assembly to deviate from vertical, or stopping the drilling assembly to avoid penetrating an undesired formation boundary.

According to aspects of the present disclosure, another method for obtaining deep resistivity measurements is described herein. The method may include obtaining first raw measurements from a first borehole within a formation. The first borehole may comprise, for example, an offset well used for surveying the formation. The method may further include obtaining second raw measurements from a drilling assembly disposed in a second borehole. In certain embodiments, the drilling assembly may comprise a drill bit and a measurement-while-drilling (MWD) or logging while drilling (LWD) assembly, and may be actively drilling the second borehole. The second raw measurements may be obtained from the MWD/LWD assembly, or another similar tool as will be described below. Notably, as will also be described below, the second raw measurement may correspond to a portion of the formation ahead of and around the drill bit. The second raw measurement may be processed and inverted to form a second set of inverted parameters. The second set of inverted parameter may then be correlated with a first set of inverted parameters, which may correspond to the first raw measurements, to identify a formation characteristic. As will be described below, using first and second sets of inverted parameters, the accuracy of the deep measurements may be increased, providing more lead time to steer the drilling assembly. The method may further include altering an operating condition of the drilling assembly based, at least in part, on the formation characteristic.

Figure 1A:
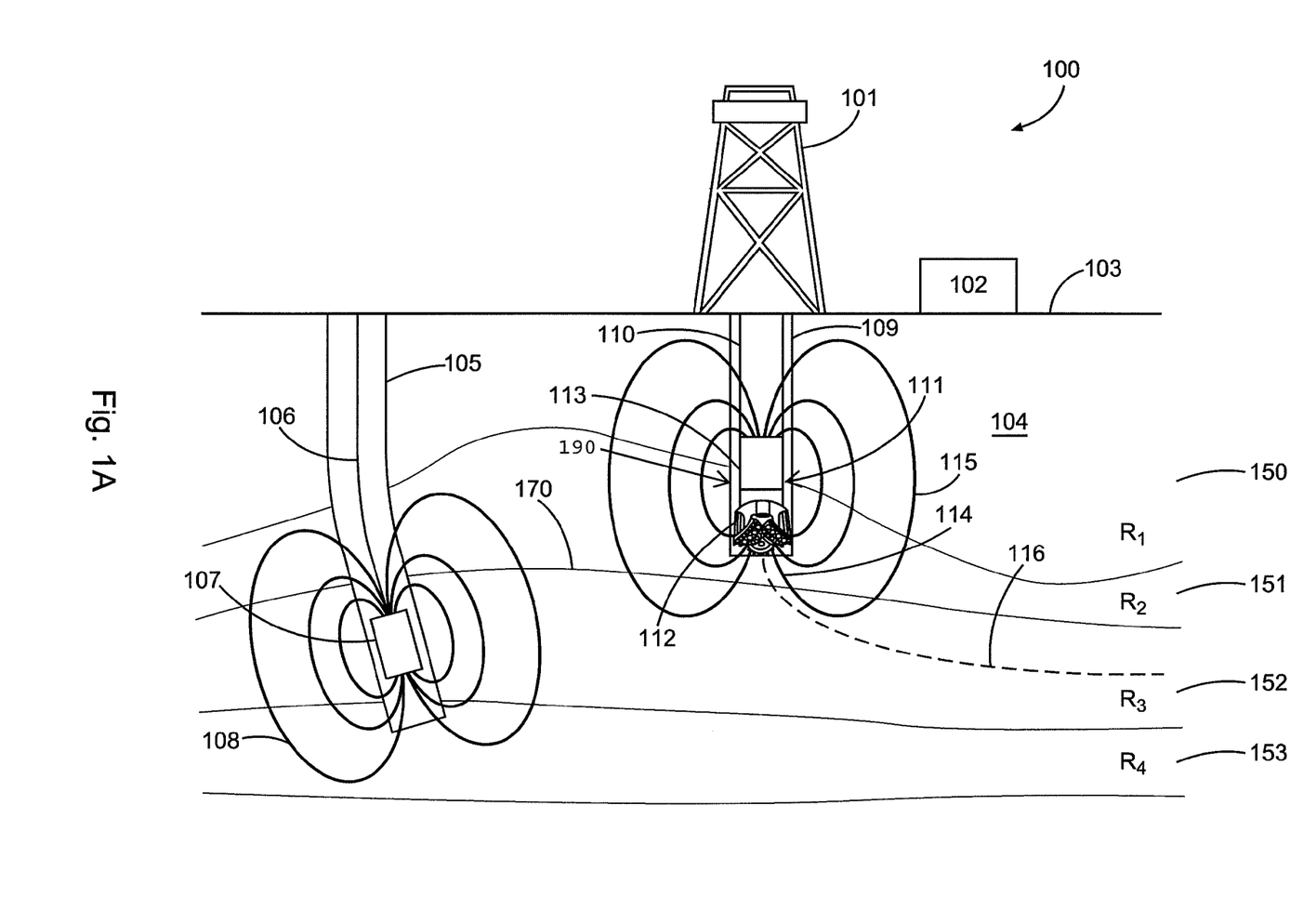
FIGS. 1A-1C illustrate example drilling systems, according to aspects of the present disclosure.
Figure 1B:
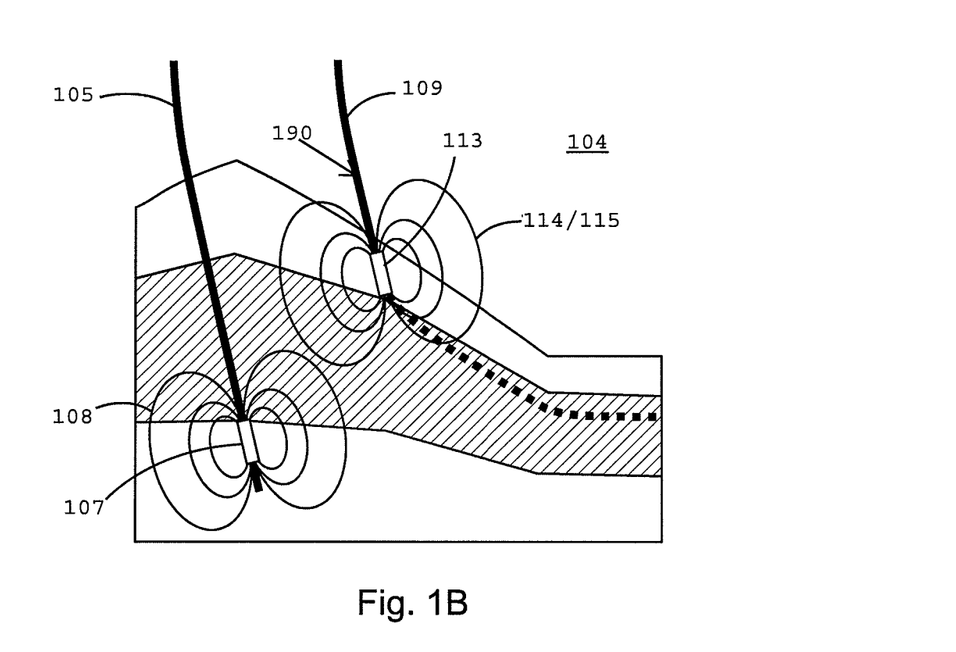
Figure 1C:
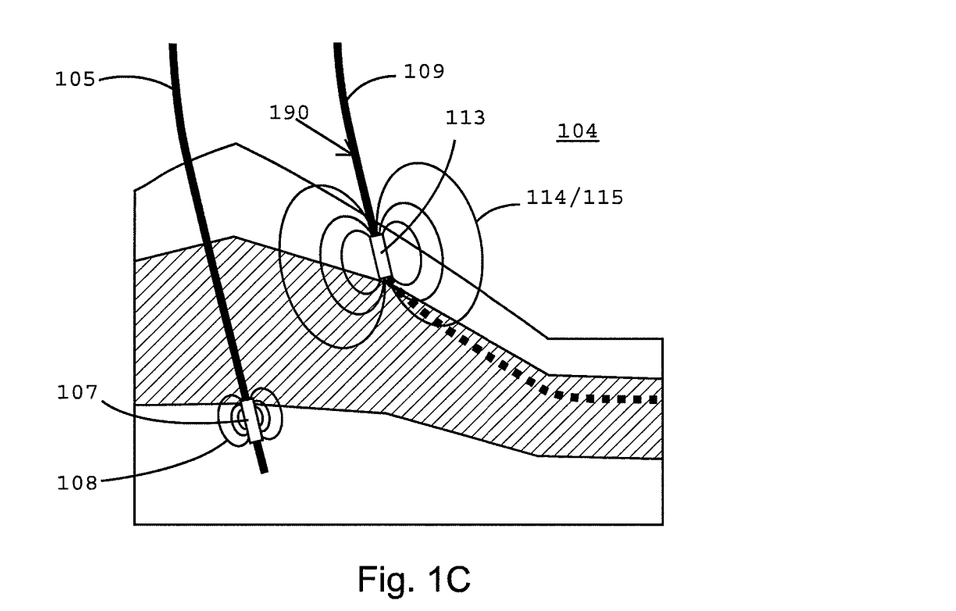

FIGS. 1A-1C show an example drilling system 100, according to aspects of the present disclosure. The drilling system 100 includes a rig 101 mounted at the surface 103 and positioned above a borehole 109 within a subterranean formation 104. A drilling assembly 190, including drill string 110 and bottom hole assembly ("BHA") 111, may be connected to the rig 101, disposed within the borehole 109, and actively drilling. The BHA 111 may comprise, for example, a drill bit 112 and a measurement or logging section 113 containing a plurality of measurement or logging devices, and other mechanical elements, such as a drilling motor, that will be described below. The measurement or logging devices may comprise a resistivity measurement tool with a variety of transmitters and receivers that induce an electromagnetic field 114/115 into the formation 104 to determine formation resistivity. The portion 114 of the electromagnetic field 114/115 may be induced ahead of the drill bit 112, and the portion 115 of the electromagnetic field 114/115 may be induced radially around the drill bit 112. The electromagnetic field and sensitivity of the system may extend radially around the BHA 111 and drill bit 112, as well as axially ahead of the drill bit 112, into a portion of the formation 104 that has not yet been pierced by the drilling assembly 190.

The drilling system 100 may further comprise a borehole 105. The borehole 105 may comprise, for example, an offset well used for survey and logging operations, a producing well which was previously used to determine formation data corresponding to formation 104, or a borehole that is currently being drilled and in which a drill string with a BHA is disposed. A downhole tool 107 may be disposed in the borehole 105 via a wireline 106, or via a drilling assembly similar to 190 disposed in borehole 109. The downhole tool 107 may comprise a resistivity tool that induces an electromagnetic field 108 into the formation 104 to determine formation resistivity. In certain embodiments, the downhole tool 107 may be configured similarly to the measurement or logging section 113 in drilling assembly 190. The electromagnetic fields 108 and 114/115 induced by both may be similar in frequency and resolution, so that the measurement data obtained by both can be compared directly, rather than having to be inverted, as will be described below.

In certain embodiments, raw measurements may be obtained from both the borehole 105 and the borehole 109. The raw measurements from borehole 105 may comprise a voltage response of the formation to the induced electromagnetic field 108. The raw measurements from borehole 109 may comprise a voltage response of the formation to the induced electromagnetic field 114/115. Generally, the raw measurements may comprise at least one of a voltage, amplitude or phase response or any linear function of these that are taken directly from the downhole tools/drilling assembly, rather than an inversion of the data, as will be discussed below. In certain embodiments, the raw measurements may be obtained from a downhole tool disposed in the borehole 105, such as downhole tool 107. The downhole tool 107 may take a variety of different configurations. For example, in certain embodiments, as can be seen in FIG. 1B, the downhole tool 107 may be a deep-reading tool disposed in borehole 105. The electro-magnetic field 108 included by the downhole tool 107 may be characterized by a large depth of investigation and thereby provide the most information regarding the surrounding formation 104, but may not accurately resolve thin formation layers. In certain embodiments, as can be seen in FIG. 1B, the downhole tool 107 may be configured similarly to the measurement or logging section 113 on the drilling assembly 190 disposed in borehole 109. Notably, downhole tool 107 may have a similar sensor configuration and resolution as measurement or logging section 113, allowing the raw measurements to be correlated without inversion to increase the deep reading accuracy, thereby decreasing the computational intensity of the deep-reading interpretation.

In certain embodiments, as can be seen in FIG. 1C, the downhole tool 107 may comprise a shallow reading tool, with the induced electromagnetic field 108 characterized by a depth of investigation smaller than the depth of investigation of a deep reading tool, increasing resolution of thin formation layers. In certain embodiments, the deep and shallow measurements may be taken using a single tool with multiple sensor placements. In certain other embodiments, multiple downhole tools may be used. Notably, if the sensor configuration and resolution is not the same as in the measurement or logging section 113 of the drilling assembly 190 in borehole 109, the raw measurements from the borehole 105 may be correlated with the raw measurements from the borehole 109 following an inversion process that will be explained below. Notably, by utilizing the inversion process, both the shallow and deep reading measurements may be incorporated into the raw measurements and used to increase the accuracy of the look ahead determination no matter the configuration of the measurement device 158.

Returning to FIG. 1A, the raw measurements obtained from borehole 109 may comprise a voltage response of the formation 104 to the induced electromagnetic field 114/115. As described above, because a portion 114 of the electromagnetic field 114/115 is induced radially around the drill bit 112 and a portion 115 of the electromagnetic field 114/115 is induced ahead of the drill bit 112, the second raw measurements may correspond to a portion of the formation ahead of and around the drill bit 112. In certain embodiments, the drilling assembly 190 may comprise a measurement device with at least one transmitter and at least one receiver coupled thereto, either on a tool within the measurement or logging section 113 or separate from section 113, to induce an electromagnetic field 114/115 into the formation and to obtain raw measurements from the formation.

The drilling assembly 190 may transmit raw measurements to a control unit 102 positioned on the surface 103. The raw measurements may be transmitted, for example, via a telemetry system or wired communication pathway. Likewise, raw measurements from the downhole tool 107 may be transmitted directly to the control unit 102, or may be obtained at the control unit 102 at some point in time after the initial formation data/survey data is measured. The control unit 102 may comprise an information handling system.

The borehole 105 and borehole 109 may penetrate the formation 104, which may comprise strata 150-153. Each of the strata 150-153 may have different resistivity values R1, R2, R3, and R4, respectively that depend on the composition of the formation. Stratum 152 may be a hydrocarbon layer in which the borehole 109 needs to be steered. In certain embodiments, the borehole 109 may need to be drilled along the pathway 116, and end within the stratum 152. In order to land the drilling assembly within the stratum 152, the precise location of a boundary 170 between strata 151 and 152 needs to be known as early as possible, to account for a limited dog leg capability of the drilling assembly, on the order of 10° per 100 feet. In certain embodiments, the raw measurements from the downhole tool 107 may be used as an a-priori information source. For example, the raw measurements can be used to create a formation model before drilling, or can be inverted by an information handling system such as control unit 102 and used to identify certain formation characteristics prior to the drill bit nearing formations of interest. The formation characteristics can include, but are not limited to, a total formation resistivity, a horizontal formation resistivity, a vertical formation resistivity, formation strata layer positions, formation strata layer widths, and formation strata layer dip angles. Likewise, the formation data may comprise general survey data about the formation 104, including formation density, sonic measurements, gamma ray measurements, etc.

Figure 2:
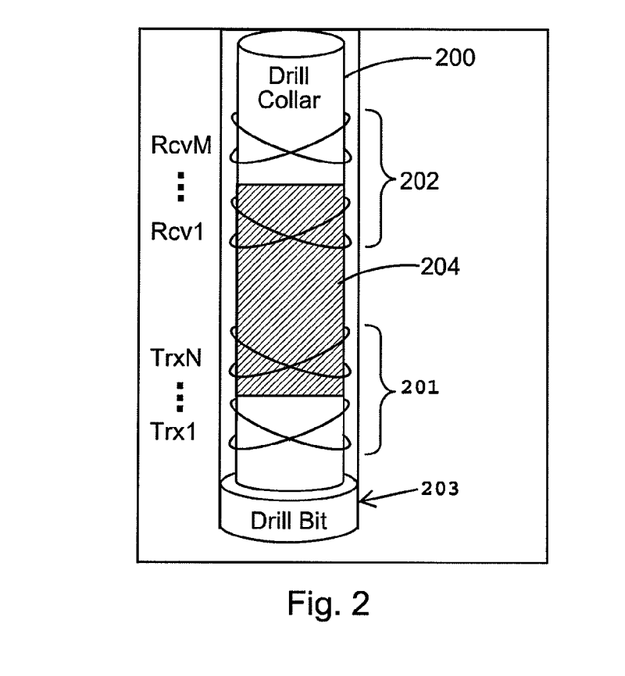
FIG. 2 illustrates an example drilling assembly, according to aspects of the present disclosure.

FIG. 2 illustrates an example drilling assembly 200. Drilling assembly 200 may correspond to drilling assembly 190, and represents one example drilling assembly configuration according to aspects of the presented disclosure. The drilling assembly 200 includes a drill bit 203 and at least one transmitter and at least one receiver in the form of a transmitter array 201 and a receiver array 202. In order to increase the depth of measurement, the transmitters 201 and receivers 202 can be separated by a radial distance on the order of 10-200 feet, as the depth of detection is approximately double the radial distance. In certain embodiments, the transmitters 201 and receivers 202 may comprise antennae or electrodes. To maximize the depth of measurement ahead of the drill bit 203, at least one of the transmitters 201 or receivers 202 may be placed as close as feasibly possible to the drill bit 203. This may include placing at least one of the transmitters 201 or receivers 202 on a drill motor 204, which is typically located near the drill bit 203. For induction measurements, the transmitters 201 and receiver 202 may be tilted coil antenna that are wound in one or more grooves in the drilling assembly 200, forming magnetic dipoles. The coils may be tilted, for example, to focus the electromagnetic field around the drilling assembly 200 or ahead of the drill bit 203.

Figure 3:
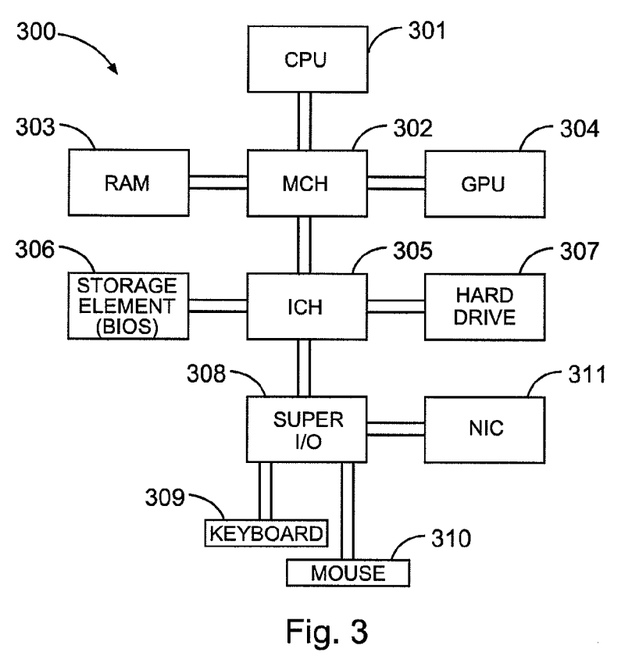
FIG. 3 illustrates an example information handling system, according to aspects of the present disclosure.

Shown in FIG. 3 is a block diagram of an example information handling system 300. Information handling systems similar to the information handling system 300 may be used as the control unit 102 from FIG. 1A. A processor or CPU 301 of the information handling system 300 may be communicatively coupled to a memory controller hub or north bridge 302. The memory controller hub 302 may be coupled to RAM 303 and a graphics processing unit 304. Memory controller hub 302 may also be coupled to an I/O controller hub or south bridge 305. I/O hub 305 may be coupled to storage elements of the computer system, including a storage element 306, which may comprise a flash ROM that includes the BIOS of the computer system. I/O hub 305 is also coupled to the hard drive 307 of the computer system. The hard drive 307 may be characterized as a tangible computer readable medium that contains a set of instructions that, when executed by the processor 301, causes the information handling system 300 to perform a pre-determined set of operations. For example, according to certain embodiments of the present disclosure, and as will be discussed below, the hard drive 307 may contain instructions that when executed cause the CPU 301 to obtain first and second raw measurements and perform complex computations on the raw measurement, including correlating the raw measurements to determine formation characteristics. The instructions may further cause the CPU 301 to alter an operating condition of the drilling assembly.

In certain embodiments, I/O hub 305 may also be coupled to a super I/O chip 308, which is itself coupled to several of the I/O ports of the computer system, including keyboard 309, mouse 310, and one or more parallel ports. The super I/O chip 308 may further be coupled to a network interface card (NIC) 311. The information handling system 300 may receive first and second formation data through the NIC 311, for processing or storage on a local storage device, such as hard drive 207. In certain embodiments, the first and second raw measurements may be obtained at the processor and saved at a dedicated mass storage device (not shown).

Figure 4:
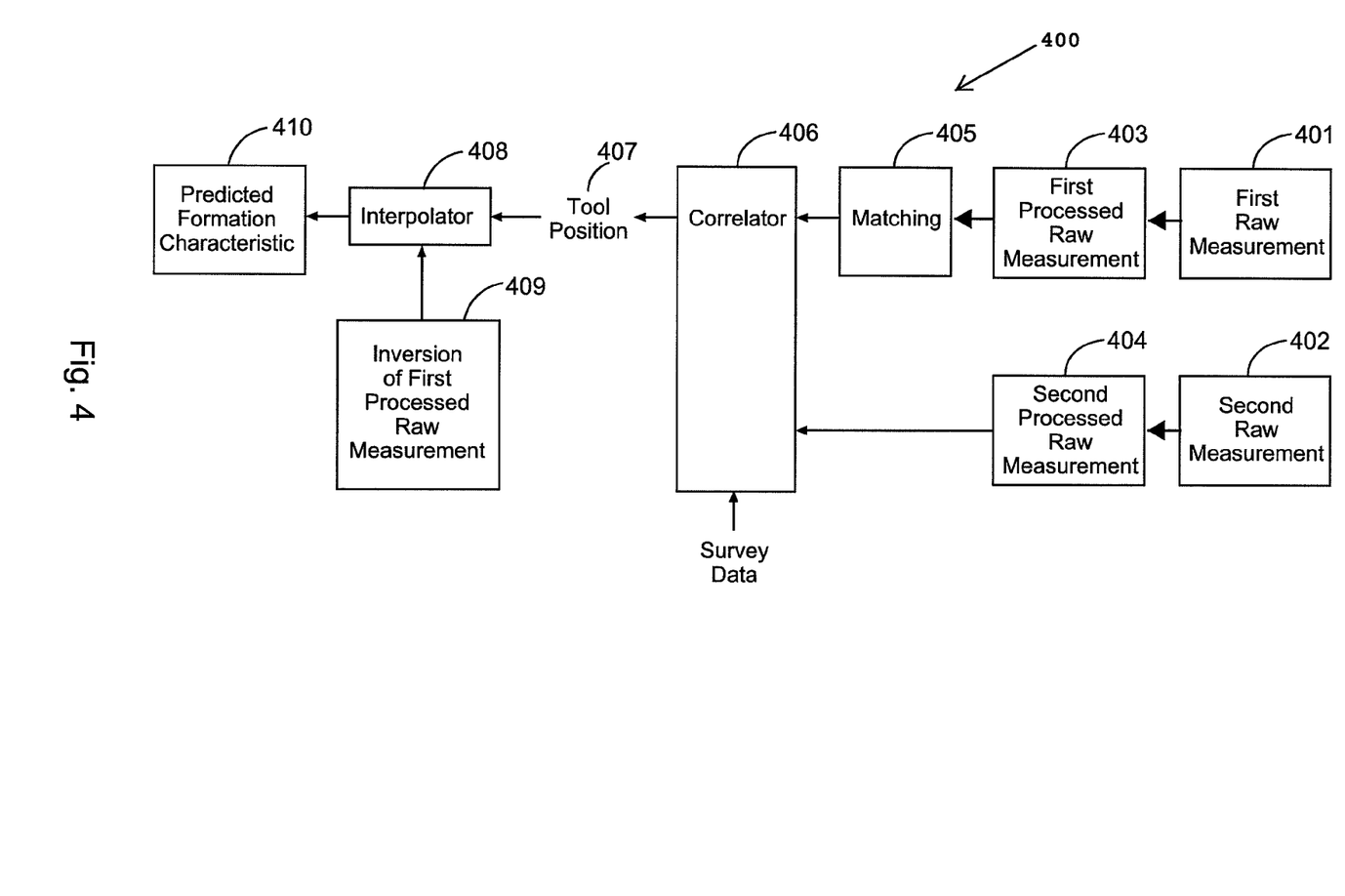
FIG. 4 illustrates an example inversion method, according to aspects of the present disclosure.

FIG. 4 illustrates an example processing scheme that may use the a-priori information from the borehole 105 with measurements from the borehole 109 taken by the drilling assembly 190 to improve the depth and accuracy of "look-ahead" measurements. The processing scheme 400 may be implemented in an information handling system, which may include a set of instructions that when executed by a processor of the information handling system cause the information handling system to perform some or all of the steps. Step 401 may comprise receiving first raw measurements from a first borehole within a formation, such as borehole 105 in FIG. 1. Step 402 may comprise receive second raw measurements from a drilling assembly disposed in a second borehole, such as the drilling assembly 190 in borehole 109 in FIG. 1. In certain embodiments, both the first raw measurements and the second raw measurements may be processed at steps 403 and 404, respectively, before any data correlation occurs. For example, processing may include receiving raw measurements from the borehole, synthesizing the signals to account for sensor type and placement, filtering for various noise and error conditions, converting the signals into polar or real/imaginary forms, amplitude/phase forms, and normalizing the signals.

At step 405, the first processed raw measurements and the second processed raw measurements may be matched. The measurements may be matched using the differences between two logs such as depth, resistivity, resolution, layer width and/or dip angle. Depth matching can be performed by aligning the similar patterns in the resistivity or any other log with respect to depth. Resistivity matching can be performed by first identifying the common layer boundaries in these two logs, and then adjusting the resistivity in each boundary in one log to match the resistivity in the other log. Resolution matching or dip angle matching can be performed by first obtaining a resistivity profile from one of the logs, and then performing modeling to produce results with the measurement tool in the other log. Resolution matching can also be performed by applying a filter that is adjusted to match the vertical resolution or depth of investigation of the logs. Layer width matching is performed by replacing the layer widths in one log with the widths of the corresponding layers from the other log, while keeping the resistivities the same. Likewise, matching may include combining some or all of the matching schemes described above. In certain embodiment, a deep reading tool can be run in an offset well for matching purposes, which can provide a more reliable reference for tracking operation. However, if the downhole tool and drilling assembly differ in configuration, depth, resistivity, resolution, layer width and/or dip angle, the first formation data may be matched with the second formation data.

At step 406, the first and second processed raw measurement may be correlated along with general formation survey data from other sources. Step 406 may also include applying interpolations to the correlated data to identify the position 407 of a downhole tool in an offset wellbore, such as tool 107 in borehole 105, at the time the first formation data was captured. Step 408 may comprise applying interpolations to a numerical inversion 409 of the first raw measurement or the first processed raw measurements and the identified position 407 of the downhole tool to produce predicted formation characteristics 410. In certain embodiments, the predicted formation characteristics from the inversion calculations may include, but are not limited to, true resistivity, horizontal resistivity, vertical resistivity, formation strata positions, and formation strata dip angles. In certain embodiment, the numerical inversion 409 of the first raw measurement or the first processed raw measurements may include values similar to the predicted formation characteristics 410, but numerical inversion 409 values may be based solely on the first raw measurements. After the predicted formation characteristics 410 are determined, an operating condition of a drilling assembly may be altered based, at least in part, on at least one of the formation characteristic. In certain embodiments, altering an operating condition may include geosteering the well, such as causing the drilling assembly to deviate from a vertical trajectory; landing the well within a desired stratum; keeping the well within a specified distance from nearby layers; and stopping the drilling assembly before it pierces an undesired stratum.

Figure 5:
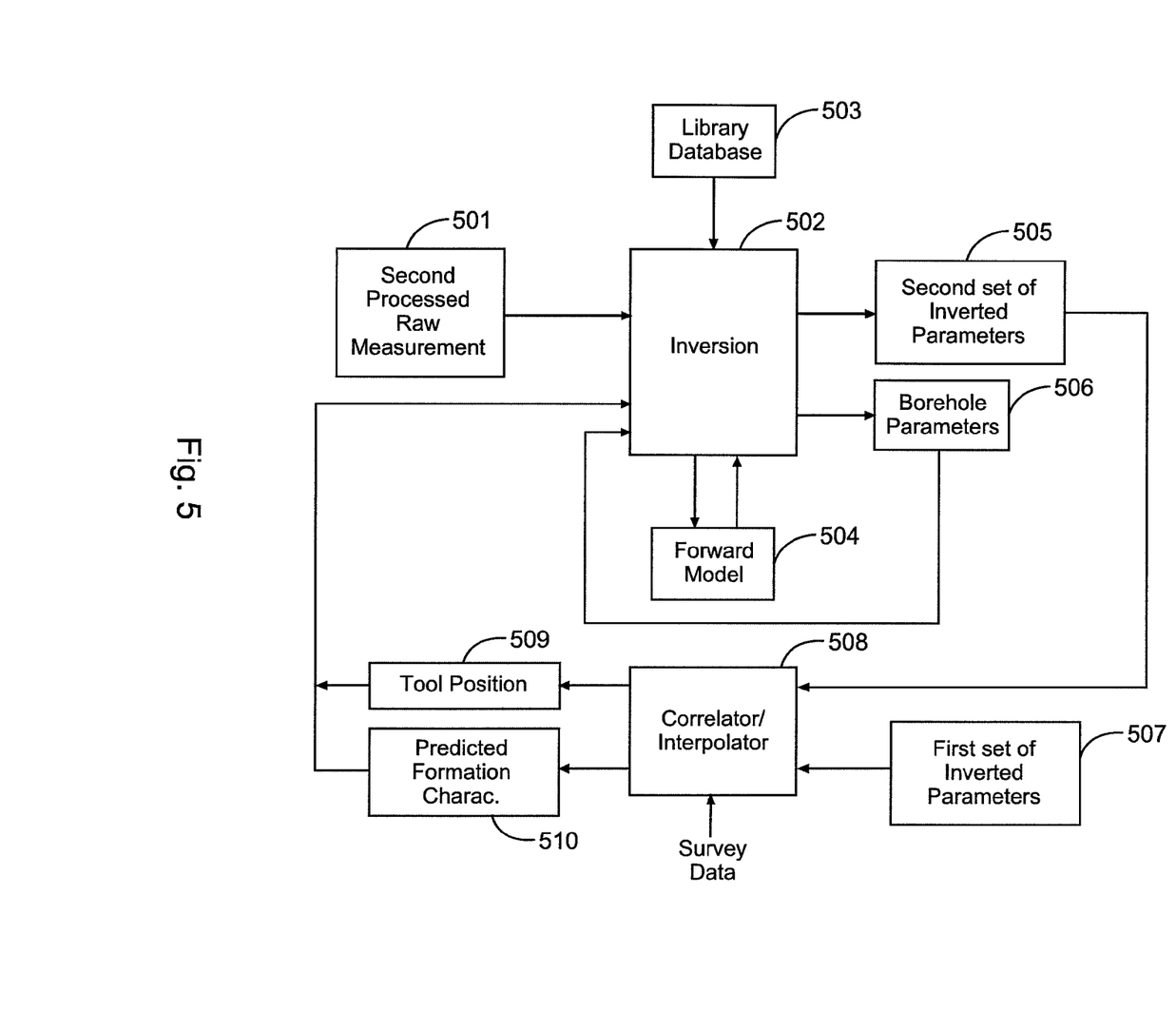
FIG. 5 illustrates an example inversion method, according to aspects of the present disclosure.

FIG. 5 illustrates another example processing scheme, according to aspects of the present disclosure. Like the processing scheme shown in FIG. 4, the processing scheme in FIG. 5 may be implemented in an information handling system, which may include a set of instructions that when executed by a processor of the information handling system cause the information handling system to perform some or all of the steps. Unlike in FIG. 4, where the second raw measurement is not inverted as part of the processing scheme, FIG. 5 inverts the second raw measurement (which may be processed before inversion) 501 at box 502, taking into account a library database 503 of existing survey data and a forward model 504 of the formation. As can be seen, the inversion 502 may produce second set of inverted parameters 505. The second set of inverted parameters 505 may include parameters corresponding to the portion of the formation around the drilling assembly and parameters corresponding to the portion of the formation ahead of the drilling assembly, including values such as total formation resistivity, a horizontal formation resistivity, a vertical formation resistivity, formation strata layer positions, formation strata layer widths, and formation strata layer dip angles. The inversion 502 may also generate borehole or well path parameters 506, which can be fed back into the inversion algorithm to improve the results.

The second set of inverted parameters 505 may then be correlated and interpolated at box 508 with a first set of inverted parameters 507 that correspond to first raw measurements from an offset well. Correlation may be performed in a combination of depth, resistivity, resolution, layer width and/or dip angle dimensions. In certain embodiments, the second set of inverted parameters 505, and first set of inverted parameters 507 may include different determinations for the same formation characteristics: total resistivity, horizontal resistivity, vertical resistivity, formation strata positions, and formation strata dip angles. The correlation and interpolation at box 508 may produce predicted formation characteristic values 510, which can then be used to alter an operating condition of a drilling assembly, and as an input to the inversion algorithm to improve the inversion accuracy. In certain embodiments, even though it is expected to yield less depth of investigation, less range and potentially less resolution, the second set of inverted parameters 505 can also be used to alter an operating condition of a drilling assembly.

Figure 6:
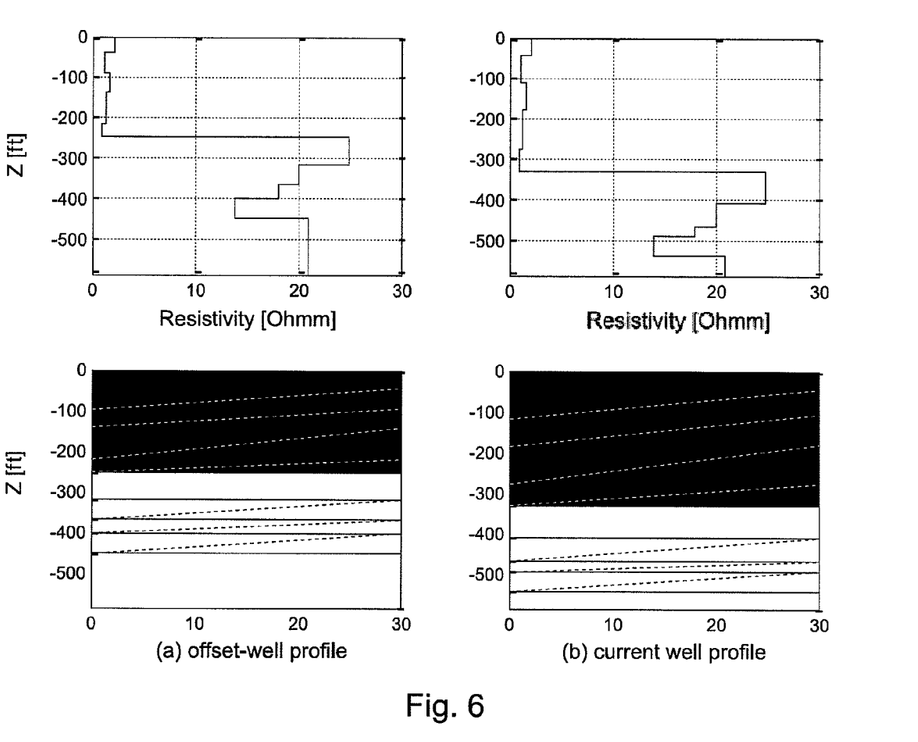
FIG. 6 illustrates an example resistivity profile for an offset well and a current well as a function of depth of the well, according to aspects of the present disclosure.
Figure 7:
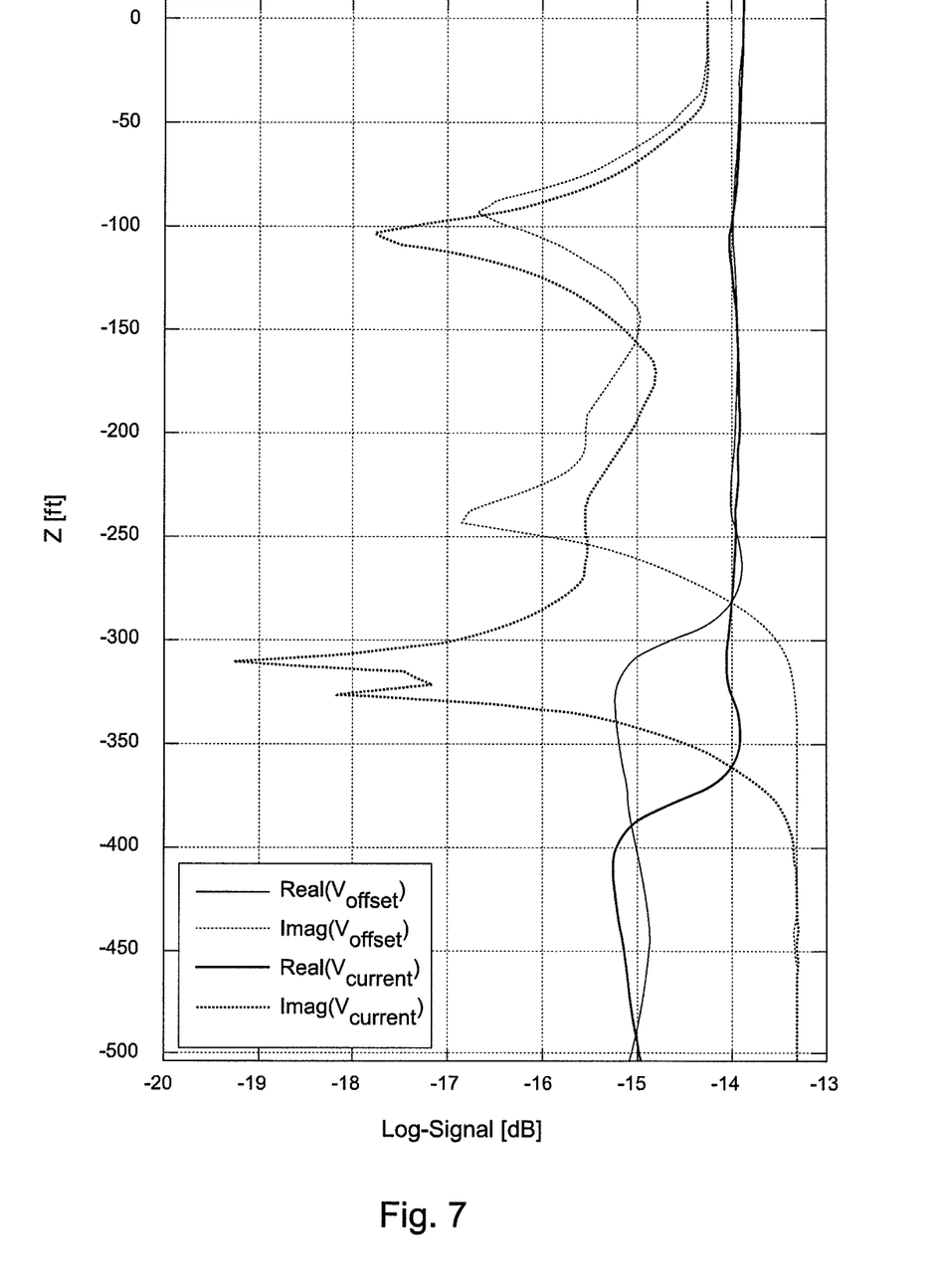
FIG. 7 illustrates raw measurement data from a current well and an offset well, according to aspects of the present disclosure.
Figure 8:
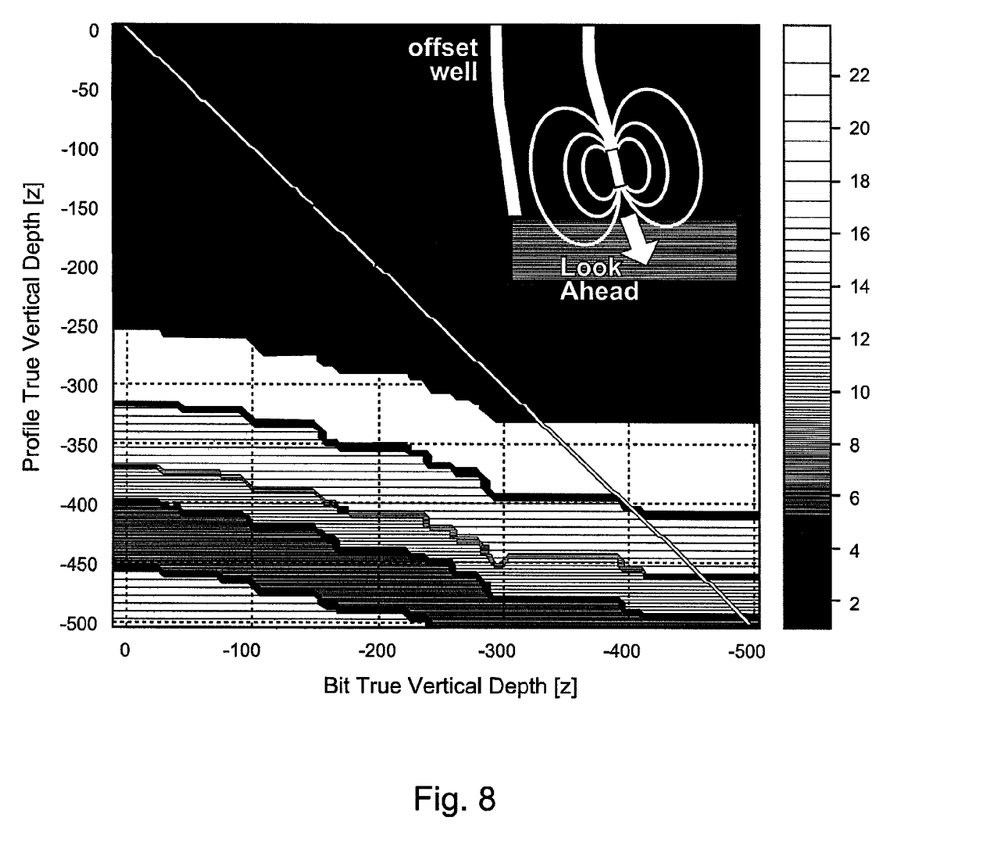
FIG. 8 illustrates the combined look ahead and look around inverted profiles as a function of bit position, according to aspects of the present disclosure.

FIG. 6 shows example resistivity profiles for an offset well (a) and a current well (b) as a function of depth of the well, with a 1 to 20 Ωm transition. The resistivity profiles may be based on the raw measurements from the offset well and current well as illustrated in FIG. 7. Notably, the raw measurements are shown in logarithmic form with real and imaginary voltage response components. As can be seen in the Figs., the same resistivity values are found in each layer, but the layer thickness changes, similar to the strata illustrated in FIG. 1. Both deep and shallow reading tools have been used in the offset well. The Z coordinates shown indicates the depth/position of the transmitter, which is in close vicinity of the bit. FIG. 8 shows the combined look ahead and look around inverted profiles (y-axis) as a function of bit position (x-axis), and illustrates the incorporation of the offset well to better define the dip angles, depth, and resistivity of the formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:
1. A method for obtaining deep resistivity measurements, comprising:

obtaining a first raw measurement from a first borehole within a formation;
obtaining a second raw measurement from a drilling assembly disposed in a second borehole within the formation, wherein the drilling assembly comprises a drill bit, and wherein the second raw measurement corresponds to a portion of the formation ahead of and around the drill bit;
processing the first raw measurement and the second raw measurement;
correlating the first processed raw measurement with the second processed raw measurement to identify the position of the drill bit;
applying interpolations to a numerical inversion of the first raw measurement or to the first processed raw measurement to identify a predicted formation characteristic ahead of the drill bit; and
altering an operating condition of the drilling assembly based, at least in part, on the predicted formation characteristic.

2. The method of claim 1, wherein processing the first raw measurement and the second raw measurement comprises at least one of:
synthesizing the first raw measurement and the second raw measurement to account for sensor type and placement;
filtering the first raw measurement and the second raw measurement for various noise and error conditions;
converting the first raw measurement and the second raw measurement into polar or real/imaginary forms; and
normalizing the first raw measurement and the second raw measurement.

3. The method of claim 1, further comprising matching the first processed raw measurement and the second processed raw measurement if a downhole tool used to obtain the first raw measurement from the first borehole differs from the drilling assembly in at least one of sensor configuration, depth, resistivity, resolution, layer width and/or dip angle.

4. The method of claim 1, wherein altering an operating condition of the drilling assembly comprises at least one of deviating from a vertical trajectory of the drilling assembly, landing to a formation layer, maintaining a certain distance from a formation layer, or stopping the drilling assembly.

5. The method of claim 1, wherein the predicted formation characteristic comprises at least one of a true formation resistivity, a horizontal formation resistivity, a vertical formation resistivity, formation strata positions, and formation strata dip angles.

6. The method of claim 2, wherein correlating the first processed raw measurement with the second processed raw measurement to identify a predicted formation characteristic ahead of the drill bit comprises:
determining a position of a downhole tool within the first borehole based, at least in part, on the correlated first and second processed raw measurements; and
identifying the predicted formation characteristic using the position and a numerical inversion of the first processed raw measurement.

7. The method of claim 1, wherein the drilling assembly comprises at least one transmitter and at least one receiver coupled thereto.

8. The method of claim 1, wherein the first raw measurement and the second raw measurement comprise first and second voltage responses, respectively.

9. A method for obtaining deep resistivity measurements, comprising:
obtaining a first raw measurement from a first borehole within a formation;
obtaining a second raw measurement from a drilling assembly disposed in a second borehole within the formation, wherein the drilling assembly comprises a drill bit, and wherein the second raw measurement corresponds to a portion of the formation ahead of and around the drill bit;
processing the second raw measurement;
performing one of a) processing the first raw measurement and inverting the processed raw measurement to form a first set of inverted parameters, or b) inverting the first raw measurement to form a first set of inverted parameters;
inverting the second processed raw measurement to form a second set of inverted parameters;
correlating the second set of inverted parameters with the first set of inverted parameters to identify a predicted formation characteristic ahead of the drill bit; and
altering an operating condition of the drilling assembly based, at least in part, on the predicted formation characteristic.

10. The method of claim 9, wherein processing the second raw measurement comprises at least one of:
synthesizing the second raw measurement to account for sensor type and placement;
filtering the second raw measurement for noise and error conditions;
converting the second raw measurement into polar or real/imaginary form; and
normalizing the second raw measurement.

11. The method of claim 9, wherein the first raw measurement includes values from a first depth of investigation and a second depth of investigation that is shallower that the first depth of investigation.

12. The method of claim 9, wherein altering an operating condition of the drilling assembly comprises at least one of deviating from a vertical trajectory of the drilling assembly, landing to a formation layer, maintaining a certain distance from a formation layer, or stopping the drilling assembly.

13. The method of claim 9, wherein the predicted formation characteristic comprises at least one of a true formation resistivity, a horizontal formation resistivity, a vertical formation resistivity, formation strata positions, and formation strata dip angles.

14. The method of claim 9, wherein inverting the second processed raw measurement to form a second set of inverted parameters comprises:
receiving the second processed raw measurement; and
inverting the second processed raw measurement based at least in part on a library database and forward modeling.

15. The method of claim 9, wherein the second set of inverted parameters comprises a resistivity value of the formation ahead of the drill bit.

16. The method of claim 9, wherein the first raw measurement and the second raw measurement comprise first and second voltage responses, respectively.

17. A system for optimizing deep resistivity measurements, comprising:
a processor;
a memory device coupled to the processor;
wherein the memory device contains a set of instructions that when executed by the processor cause the processor to:
receive a first raw measurement from a first borehole within a formation;

receive second raw measurement from a drilling assembly disposed in a second borehole within the formation, wherein the drilling assembly comprises a drill bit, and wherein the second raw measurement corresponds to a portion of the formation ahead of and around the drill bit;

performing one of a) processing the first raw measurement and inverting the first processed raw measurement to form a first set of inverted parameters, or b) inverting the first raw measurement to form a first set of inverted parameters;

process the second raw measurement and invert the second processed raw measurement to form a second set of inverted parameters;

correlate the first set of inverted parameters with the second set of inverted parameters to identify a predicted formation characteristic ahead of the drill bit; and alter an operating condition of the drilling assembly based, at least in part, on the predicted formation characteristic.

18. The system of claim 17, wherein the set of instructions when executed by the processor further cause the processor to match the first processed raw measurement and the second processed raw measurement if a downhole tool used to obtain the first raw measurement from the first borehole differs from the drilling assembly in at least one of sensor configuration, depth, resistivity, resolution, layer width and/or dip angle.

19. The system of claim 17, wherein the first raw measurement and the second raw measurement comprise first and second voltage responses, respectively.

20. The system of claim 17, wherein the predicted formation characteristic comprises at least one of a true formation resistivity, a horizontal formation resistivity, a vertical formation resistivity, formation strata positions, and formation strata dip angles.

* * * * *